United States Patent
Ohkame et al.

(10) Patent No.: US 12,370,503 B2
(45) Date of Patent: Jul. 29, 2025

(54) COMPOSITE MEMBRANE AND METHOD FOR PRODUCING COMPOSITE MEMBRANE

(71) Applicant: TOYOBO CO., LTD., Osaka (JP)

(72) Inventors: Takashi Ohkame, Otsu (JP); Masafumi Shibuya, Otsu (JP)

(73) Assignee: TOYOBO CO., LTD., Osaka (JP)

( * ) Notice: Subject to any disclaimer, the term of this patent is extended or adjusted under 35 U.S.C. 154(b) by 640 days.

(21) Appl. No.: 17/641,152

(22) PCT Filed: Sep. 11, 2020

(86) PCT No.: PCT/JP2020/034487
§ 371 (c)(1),
(2) Date: Mar. 8, 2022

(87) PCT Pub. No.: WO2021/049623
PCT Pub. Date: Mar. 18, 2021

(65) Prior Publication Data
US 2022/0288539 A1    Sep. 15, 2022

(30) Foreign Application Priority Data
Sep. 13, 2019   (JP) .................................. 2019-167126

(51) Int. Cl.
*B01D 69/12* (2006.01)
*B01D 61/02* (2006.01)
(Continued)

(52) U.S. Cl.
CPC ....... *B01D 69/1214* (2022.08); *B01D 61/025* (2013.01); *B01D 67/0006* (2013.01);
(Continued)

(58) Field of Classification Search
CPC .............. B01D 69/1214; B01D 61/025; B01D 67/0006; B01D 67/0093; B01D 69/08;
(Continued)

(56) References Cited

U.S. PATENT DOCUMENTS

2009/0191399 A1   7/2009   Moore et al.
2012/0031834 A1   2/2012   Higa et al.
(Continued)

FOREIGN PATENT DOCUMENTS

CN    101492559 A    7/2009
CN    102149450 A    8/2011
(Continued)

OTHER PUBLICATIONS

English Machine Translation of JP2018058040A (Year: 2018).*
(Continued)

*Primary Examiner* — Madeline Gonzalez
(74) *Attorney, Agent, or Firm* — WHDA, LLP (57) ABSTRACT

A composite membrane comprising a supporting membrane that includes polyphenylene oxide and a separation layer that is disposed on one main surface of the supporting membrane, wherein the polyphenylene oxide is sulfonated on the one main surface of the supporting membrane and the separation layer includes polyvinyl alcohol having an ionic functional group.

7 Claims, 5 Drawing Sheets

(FIRST CYCLE)

(a) STEP OF ADSORBING BY Layer-by-Layer (LbL)

(b) STEP OF DENSIFYING PVA LAYER BY CROSS-LINKING (51) Int. Cl.
*B01D 67/00* (2006.01)
*B01D 69/08* (2006.01)
*B01D 69/10* (2006.01)
*B01D 71/38* (2006.01)
*B01D 71/52* (2006.01)
*C08J 9/36* (2006.01)

(52) U.S. Cl.
CPC ......... *B01D 67/0093* (2013.01); *B01D 69/08* (2013.01); *B01D 69/107* (2022.08); *B01D 69/125* (2013.01); *B01D 71/381* (2022.08); *B01D 71/5223* (2022.08); *C08J 9/36* (2013.01); *C08J 2371/12* (2013.01)

(58) Field of Classification Search
CPC .. B01D 69/107; B01D 69/125; B01D 71/381; B01D 71/5223; B01D 67/00931; B01D 2323/30; B01D 2325/14; B01D 2325/16; B01D 71/82; C08J 9/36; C08J 2371/12
USPC ............ 210/500.23, 500.21, 500.41, 500.42, 210/488–492, 321.75, 321.84
See application file for complete search history.

(56) References Cited

U.S. PATENT DOCUMENTS

| | | | |
|---|---|---|---|
| 2015/0209736 A1 | 7/2015 | Ohkame et al. | |
| 2019/0076791 A1 | 3/2019 | Ohkame | |

FOREIGN PATENT DOCUMENTS

| | | | | | |
|---|---|---|---|---|---|
| CN | 102458618 | A | 5/2012 | | |
| CN | 104437145 | A | 3/2015 | | |
| CN | 108136344 | A | 6/2018 | | |
| JP | 2-14725 | A | 1/1990 | | |
| JP | H09-052031 | A | 2/1997 | | |
| JP | H10-309449 | A | 11/1998 | | |
| JP | 2015-181990 | A | 10/2015 | | |
| JP | 6094922 | B1 | 3/2017 | | |
| JP | 2018-58040 | A | 4/2018 | | |
| JP | 2018058040 | A | * | 4/2018 | ............ B01D 65/10 |
| WO | 2010/006196 | A2 | 1/2010 | | |
| WO | 2010/119858 | A1 | 10/2010 | | |
| WO | 2012/081026 | A2 | 6/2012 | | |
| WO | 2012/174463 | A1 | 12/2012 | | |
| WO | 2014/054346 | A1 | 4/2014 | | |
| WO | 2017/064936 | A1 | 4/2017 | | |
| WO | 2018/003949 | A1 | 1/2018 | | |
| WO | 2018/066631 | A1 | 4/2018 | | |

OTHER PUBLICATIONS

International Search Report dated Nov. 2, 2020, issued in counterpart International Application No. PCT/JP2020/034487 (2 pages).
Wang Chuanqing et al., "Preparation and Characterization of Sulfonated Poly(phenylence oxide)", Polymer Journal, vol. 27, No. 2, Feb. 1, 1995, pp. 173-178; Cited in Extended European Search Report dated Aug. 22, 2023. (6 pages).
Extended (Supplementary)European Search Report dated Aug. 22, 2023, issued in counterpart EP Application No. 20862648.1. (9 pages).
Office Action dated Apr. 27, 2023, issued in counterpart CN Application No. 202080064013.9, with English Translation. (11 pages).

* cited by examiner

FIG.1 (FIRST CYCLE)

FIG.2 (SECOND CYCLE)

(a)

STEP OF ADSORBING BY
Layer-by-Layer (LbL)

(b)

STEP OF DENSIFYING PVA LAYER BY
CROSS-LINKING

FIG.4 (SECOND CYCLE)

(a)

STEP OF ADSORBING BY
Layer-by-Layer (LbL)

(b)

STEP OF DENSIFYING PVA LAYER BY
CROSS-LINKING

FIG.5

COMPOSITE MEMBRANE AND METHOD FOR PRODUCING COMPOSITE MEMBRANE

TECHNICAL FIELD

The Present invention relates to a composite membrane and a method for producing a composite membrane.

BACKGROUND ART

Reverse osmosis (RO) membranes and the like have a pore size of several angstroms, and thus has high resistance of filtration. Thus, a composite membrane is preferably used which includes an ultrafiltration membrane having excellent water permeability as a supporting membrane and a separation layer in a thin film state formed on the surface of the supporting membrane and thus has a reduced permeation resistance.

As a composite membrane prepared by a coating method involving use of polyphenylene oxide having excellent chemical durability as a supporting membrane, Patent Literature 1 (WO 2014/054346) discloses a composite separation membrane comprising a supporting membrane comprising polyphenylene oxide (polyphenylene ether) and a separation layer on the surface thereof, the separation layer comprising a sulfonated polyarylene ether copolymer having a repeated structure of a hydrophobic segment and a hydrophilic segment.

Furthermore, Patent Literature 2 (WO 2017/064936) discloses a composite membrane comprising a composite separation membrane similar to that of Patent Literature 1 (on the surface of the sulfonated. polyarylene ether copolymer) and a separation layer on the surface thereof, the separation layer prepared by adsorbing and crosslinking polyvinyl alcohol having an ionic functional group by a Laver-by-Layer method (e.g., G. Decher, Science, vol. 277, issue 5330, pp. 1232-1237, 1997). Forming a separation layer made of polyvinyl alcohol (PVA) having an ionic functional group improves the properties of rejecting neutral low molecular weight substances.

In a separation membrane prepared by applying a Layer-by-Layer method (LbL method), a plurality of polymer layers carrying a positive or negative charge are alternately laminated on the surface of a supporting membrane (on the surface carrying a charge). The LbL method enables easy lamination of defect-free thin films and thus. the amount of thin film materials such as polymer to be used can be very small. Accordingly, the method is economical and has little environmental load. In Patent Literature 2 the LbL method is available because the sulfonated polyarylene ether copolymer is charged.

CITATION LIST

Patent Literature

PTL 1: WO 2014/054346
PTL 2: WO 2017/064936.

SUMMARY OF INVENTION

Technical Problem

However, in Patent Literature 2, it is necessary to prepare a composite membrane by laminating a separation layer made of a sulfonated polyarylene ether copolymer on the polyphenylene oxide (PPO) supporting membrane by a coating method or the like before forming a cross-linked PVA membrane by the LbL method. This has the problem of a complicated process of production and high production cost. Furthermore, since uneven thickness of coating is inevitable in the coating method in Patent Literature 2, the problem is that defects such as pinholes and cracks are easily generated in the separation layer when the separation layer is formed in the step of drying after coating.

Moreover, usually no strong bond such as a covalent bond or an ionic bond is present between the supporting membrane and the separation layer in a composite membrane prepared by the conventional interfacial polymerization method or coating method. For this reason, the problem of peeling of the separation layer is caused in treatment in which water pressure is applied from the side of the supporting membrane to the side of the separation layer as in backwash, though the integrity of membrane is not a problem in normal operation of filtration, i.e., when water pressure is applied from the side of the separation layer to the side of the supporting membrane.

More specifically, in Patent Literature 2, adhesiveness between the sulfonated polyarylene ether copolymer layer and the polyvinyl alcohol layer is excellent due to adhesion force of an ionic bond; however, since there is no chemical bond between the PPO supporting membrane and the sulfonated polyarylene ether copolymer layer, backwash easily causes peeling of the separation layer, and this results in the problem of reduction of the performance of the membrane.

In consideration of the above problems, an object of the present invention is to provide a composite membrane comprising a supporting membrane including polyphenylene oxide (PPO) and a separation layer including polyvinyl alcohol (PVA) having an ionic functional group, which can be produced by a simple method and has excellent bonding properties between the supporting membrane and the separation layer, and in which peeling of the separation layer and defects in the separation layer, such as pinholes, are not easily caused in backwash and the like.

Solution to Problem (1) A composite membrane comprising: a supporting membrane that includes polyphenylene oxide; and a separation layer that is disposed on one main surface of the supporting membrane, wherein the polyphenylene oxide is sulfonated on the one main surface of the supporting membrane and the separation layer includes polyvinyl alcohol having an ionic functional group.

(2) The composite membrane according to (1), wherein the one main surface of the supporting membrane has a ratio of elemental sulfur of 0.2 to 10%.

(3) The composite membrane according to (1) or (2), wherein the ionic functional group is a cationic functional group including a quaternary ammonium group.

(4) The composite membrane according to any of (1) to (3), wherein the ionic functional group is an anionic functional group including a sulfonic acid group.

(5) The composite membrane according to any of (1) to (4), wherein the polyvinyl alcohol is crosslinked in the separation layer.

(6) A method for producing the composite membrane according to any of (1) to (5), comprising: bringing sulfuric acid into contact with a surface of the supporting membrane, thereby sulfonating at least part of the surface; and adsorbing the separation layer to the sulfonated surface of the supporting membrane.

(7) The method according, to (6), wherein sulfuric acid having a concentration of 90 to 98% by mass is brought into contact with the surface of the supporting membrane in the sulfonating.

(8) A porous membrane comprising polyphenylene oxide, wherein polyphenylene oxide is sulfonated on one main surface of the porous membrane.

ADVANTAGEOUS EFFECTS OF INVENTION

The present invention provides a composite membrane comprising a supporting membrane comprising polyphenylene oxide (PPO) and a separation layer comprising polyvinyl alcohol (PVA) having an ionic functional group, which can be produced by a simple method and which has excellent bonding properties between the supporting membrane and the separation layer.

In the present invention, the surface of the PPO supporting membrane may be sulfonated and a separation layer made of polyvinyl alcohol having an ionic functional group may be laminated on the sulfonated surface. Thus, it is not necessary to prepare a composite membrane composed of a PPO membrane and a separation layer made of sulfonated polyarylene ether copolymer, and therefore a composite membrane comprising a supporting membrane comprising PPO and a separation layer comprising PVA can be produced by a simple method.

Furthermore, in the present invention, the supporting membrane. as an asymmetric membrane structure in which a PPO phase is gradually replaced by a sulfonated PPO phase, and thus the membrane does not have a bonding interface of different polymers as in the composite membrane of a PPO membrane and a sulfonated polyarylene ether copolymer disclosed in Patent Literature 2. Thus, defects such as peeling of the separation layer in, for example, backwash, are unlikely to occur.

Moreover, the PVA separation layer is bonded to the sulfonated surface of the PPO supporting membrane (sulfonated PPO) via an ionic bond. Thus, the supporting membrane and the separation layer are firmly bonded also in the composite membrane finally prepared, and thus defects such as peeling of the separation layer in, for example, backwash, are unlikely to occur.

DESCRIPTION OF EMBODIMENTS

Composite Membrane

The composite membrane of the present invention comprises a supporting membrane that includes polyphenylene oxide and a separation layer that is disposed on one main surface of the supporting membrane.

Polyphenylene oxide is sulfonated on one main surface (the main surface on which the separation layer is disposed) of the supporting membrane.

The separation layer includes polyvinyl alcohol having an ionic functional group.

The composite membrane of the present invention comprises a separation layer made of polyvinyl alcohol having an ionic functional group (e.g., a cross-linked PVA thin film) on the main surface of a supporting membrane comprising polyphenylene oxide (e.g., a supporting membrane comprising an anionic sulfonated polyphenylene oxide). Thus, the membrane has high separability for monovalent or polyvalent ions, neutral substances and the like, and thus may be preferably used as, for example, a liquid treatment membrane and gas separation membrane. In particular, the composite membrane may be preferably used as a reverse osmosis membrane.

Supporting Membrane

The supporting membrane comprises polyphenylene oxide (PPO). It is preferable that the supporting membrane be a porous membrane.

The supporting membrane may be made of PPO alone or may include a material other than PPO. It is preferable that PPO be present on at least one main surface of the supporting membrane. Polyphenylene oxide is an engineering plastic which has excellent chemical durability for alkali and free chlorine, excellent water resistance, and excellent mechanical strength, and fabricability suitable for forming a film from a solution.

The present inventors have found that the surface of the supporting membrane comprising PPO can be easily and efficiently sulfonated by bringing concentrated sulfuric acid into contact with the surface without reducing mechanical strength of the supporting membrane.

Typical examples of polyphenylene oxide (PPO) include poly(2,6-di methyl-1,4-phenylene oxide) having the structure represented by the following formula (1). In the formula, n represents a natural number.

[Formula 1]

(1)

Examples of commercially available engineering plastics include polyethersulfone, polysulfone, polyphenylsulfone, polyvinylidene fluoride, polyether ether ketone, polyphenylene oxide (PPO) and polyphenylene sulfide. Only polyphenylene oxide can be easily sulfonated using sulfuric acid without reduction in the molecular weight and is insoluble in sulfuric acid.

Polyarylsulfone polymers such as polyethersulfone, polysulfone and polyphenylsulfone, for example, are dissolved in sulfuric acid or swell significantly. In addition, these polymers are difficult to sulfonate on adjacent benzene rings because of electron withdrawing properties of the sulfonyl group in the main chain. For these reasons, sulfonation of a supporting membrane with sulfuric acid is difficult.

Since polyvinylidene fluoride does not have a benzene ring in the chemical structure, sulfonating polyvinylidene fluoride with sulfuric acid is difficult. Although such polymers can be sulfonated under harsh conditions such as high temperature concentrated sulfuric acid, chlorosulfuric acid or fuming sulfuric add, they are not preferable because they are likely to cause damage to the structure of the supporting membrane or not preferable from economical or working viewpoint. Polyether ether ketone is easily sulfonated with sulfuric acid, but is dissolved in sulfuric acid. Polyphenylene sulfide is insoluble in almost all solvents, making the formation of a film from a solution itself difficult.

It is preferable that polyphenylene oxide used for the supporting membrane have a number average molecular weight of 5,000 or more and 500,000 or less. In that range, polyphenylene oxide is soluble in nonprotic solvent such as N-methyl-2-pyrrolidone (NMP), N,N-dimethylacetamide (DMAc) and N,N-dimethylformamide (DMF) at high temperature, and thus a supporting membrane having sufficient strength can be prepared by a wet phase separation method or a dry wet phase separation method.

The above supporting membrane may include various types of known additives to optimize membrane properties. Examples of additives include a polymer (e.g., polystyrene), a filler, a surfactant and a hydrophilizing agent (e.g. polyethylene glycol. and polyvinyl pyrrolidone).

For the solvent which dissolves polyphenylene oxide, WO 2014/054346 can be referred to, for example. Examples of solvents include nonprotic polar solvents such as N-methyl-2-pyrrolidone (NMP), N,N-dimethylacetamide (DMAc) and N,N-dimethylformamide (DMF). These solvents can dissolve PPO at a temperature of about 80° C. or more and has relatively low environmental load, and thus these solvents can be preferably used. Of them, NMP is more preferred.

A wet phase separation method or a dry wet phase separation method may be preferably used as the method for forming a film to prepare the supporting membrane. The wet film forming method is a method for forming a membrane structure, in which a stock solution for film formation is immersed in a coagulation bath of a non-solvent which is mixed with a good solvent in the stock solution but in which polymer is insoluble to precipitate polymer by phase separation. The dry wet film forming method is a method in which solvent is evaporated and dried for a certain time from the surface of a stock solution for film formation immediately before immersing the stock solution in a coagulation bath to give an asymmetric structure in which the density of polymer on the surface of the membrane is high. In the present invention, it is more preferable to select the dry wet film forming method.

The form of the supporting membrane (and the composite membrane) according to the present invention is not particularly limited, and a flat membrane and a hollow fiber membrane are preferred. These membranes can be prepared by a method known to a person skilled in the art. For example, a flat membrane may be produced by casting a stock solution on a substrate, optionally drying for a predetermined period, and then immersing the resultant in a coagulation bath. A hollow fiber membrane may be produced by discharging a stock solution through the outer slit of a double cylindrical spinning nozzle in the form of a hollow cylinder while extruding a fluid through the inner slit together with the stock solution, optionally drying for a predetermined period, and then immersing the resultant in a coagulation bath, wherein examples of the fluid include a non-solvent, an implicit solvent, a good solvent or a mixed solvent thereof, or liquid which is not compatible with the film forming solvent, or gas such as nitrogen or air.

The concentration of polyphenylene oxide in the stock solution for film formation is preferably by mass or more and 60% by mass or less, and more preferably 10% by mass or more and 50% by mass or less in view of provision of sufficient mechanical strength of the supporting membrane and optimization of water permeability and surface pore diameters of the supporting membrane (porous supporting membrane).

The temperature of the stock solution for film formation is preferably 40° C. or more and more preferably 60° C. or more. For the upper limit, the temperature is preferably the boiling point or less of the above non-polar protonic solvent, more preferably 150° C. or less, and further preferably less than 100° C. When the temperature of the stock solution is less than the above range, polyphenylene oxide may precipitate due to thermally induced phase separation. By contrast, when the temperature of the stock solution is far beyond the above range, the viscosity of the stock solution is reduced, making fabrication difficult. Furthermore, since too high a temperature of the stock solution brings about an increased rate of evaporation of the good solvent in the stock solution and an increased rate of solvent exchange in the coagulation bath, the density of polymer on the surface of the membrane may be extremely increased, and thus water permeability of the supporting membrane may be significantly reduced.

There is a predetermined period of drying solvent in the dry wet film forming method before the step of immersing the stock solution in a coagulation bath. The time and the temperature of drying are not particularly limited, and are to be adjusted so that the asymmetric structure of the supporting membrane finally prepared is as desired. It is preferable that part of the solvent be dried in an atmosphere at a temperature of 5 to 200° C. for 0.01 to 600 seconds.

The non-solvent in the coagulation bath used for the wet film forming method or the dry wet film forming method is not particularly limited, and is preferably water, alcohol, polyhydric alcohol (such as ethylene glycol, diethylene glycol, triethylene glycol, glycerol), and may be a mixture liquid thereof, as in known film forming methods. It is preferable that the main component be water from convenient and economical viewpoint.

Furthermore, it is preferable to add a film forming solvent (e.g., NMP, DMAc) to the non-solvent in the coagulation bath in view of control of the rate of solvent exchange in the coagulation process and provision of a preferable membrane structure. Polysaccharide and water-soluble polymers may be added to the coagulation bath in view of control of the viscosity of the coagulation bath.

The temperature of the coagulation bath is appropriately selected in view of control of the pore size of the supporting membrane (porous supporting membrane), economic efficiency and operational safety. More specifically, the temperature is preferably 5° C. or more and less than 100° C., more preferably 10° C. or more and 80° C. or less. When the temperature is lower than the range, the viscosity of the coagulation solution is increased, thereby resulting in slow progress of the process of demixing, and as a result the structure of the membrane becomes dense, so that water permeability of the membrane is likely to be reduced. When the temperature is higher than the range, the process of demixing progresses instantly, and as a result the membrane structure becomes coarse, so that the strength of the membrane is likely to be reduced.

The time of immersion in the coagulation bath may be adjusted to a time in which the structure of the supporting membrane is sufficiently formed by phase separation. The time is preferably in the range of 0.1 to 1,000 seconds, more preferably 1 to 600 seconds in view of sufficient progress of coagulation and avoiding processes from getting long.

It is preferable that the supporting membrane obtained after completing formation of a membrane structure in the coagulation bath be washed with water. The method of washing with water is not particularly limited, and the membrane may be immersed in water for a sufficient time, or may be washed with running water for a predetermined time while being transferred between rolls.

The supporting membrane after water washing may be stored in a hydrous state or a dry state.

Sulfonation of Supporting Membrane

In the above supporting membrane, PPO is sulfonated on one main surface. It is preferable that the sulfonated main surface have an anionic charge derived from a sulfonic acid group.

A method for sulfonation in which a sulfonating agent is brought into contact with the surface of a supporting membrane is particularly preferably used as a method for sulfonation. The method is preferred because of the following: when a solution in which the concentration of the sulfonating agent has been suitably controlled is brought into contact with a membrane, only the surface of the membrane and fine pores on the surface are sulfonated, whereas polymer components in bulk (in the inside) are not sulfonated, and thus the surface of the membrane can be sulfonated to a high degree without reducing mechanical strength of the whole membrane.

The sulfonated membrane thus formed is an asymmetric membrane having an inclined structure in which a bulk neat polymer phase is gradually replaced by a sulfonated polymer phase, and thus the membrane has a great advantage in that peeling of the separation layer is not caused even in operation in which water pressure is applied from the side of the supporting membrane to the side of the separation layer as in backwash.

In the supporting membrane, PPO may he sulfonated on at least one main surface (the main surface on which the separation layer is disposed). When the method for sulfonation described above is used, the surface portion (including the surface of fine pores) is usually sulfonated in addition to the surface of the supporting membrane.

By sulfonation, polyphenylene oxide is formed into a copolymer including a structural unit into which a sulfonic acid group has been introduced, which is shown on the right of the following formula (2). In the formula (2), n and m each independently represent a natural number.

[Formula 2]

(2)

In the present invention, the method for sulfonation does not include a method for preparing a composite membrane by applying a polymer which has been previously sulfonated to a supporting membrane. The reason is that in a composite membrane prepared by such a method, peeling of the separation layer is likely to occur in operation such as backwash as described above.

Furthermore, in the method for preparing a supporting membrane by using a polymer which has been previously sulfonated (PPO) or a polymer stock solution including a sulfonated polymer as a stock solution, not only the surface of the membrane but also the bulk phase (the inside) are sulfonated. However, a supporting membrane made of polymer having high sulfonation degree all over the whole membrane has the problem of reduction of mechanical strength. Thus, a method by which the polymer inside of the membrane is not sulfonated is preferred, though the surface of the supporting membrane needs to be sufficiently sulfonated to effectively carry out the step for adsorbing ionic polyvinyl alcohol by the Layer-by-Layer method described later.

It is preferable to use sulfuric acid as a sulfonating agent because it is convenient and inexpensive. Since polyphenylene oxide is susceptible to electrophilic substitution reaction on the benzene ring in the main chain thereof and does not include an electron withdrawing functional group such as sulfonic group in the main chain, polyphenylene oxide can be easily sulfonated.

The concentration of sulfuric acid is preferably 90% or more and 98% or less, more preferably 92% or more and 96% or less. The present inventors have found that the supporting, membrane can he sulfonated with sulfuric acid having a relatively low concentration of about 92 to 96%.

The time of contact with sulfuric acid depends on the concentration of sulfuric acid and the reaction temperature, and is preferably 10 seconds to 6 hours, and more preferably 30 seconds to 2 hours.

When the concentration of sulfuric acid is lower than the range or when the reaction time is shorter than the range, the supporting membrane may not be sufficiently sulfonated, and adsorption of ionic polyvinyl alcohol at the later stage may not proceed effectively to fail to obtain sufficient separability. When the concentration of sulfuric acid is higher than the range or when the reaction time is longer than the range the supporting membrane may be excessively sulfonated, and as a result the surface of the membrane may be swelled to increase the size of fine pores, so that sufficient separability may not be obtained.

A sulfonating agent having higher reactivity, such as chlorosulfuric acid, fuming sulfuric acid and sulfur trioxide may also be used as another sulfonating agent. It is preferable to use sulfuric acid in view of the cost, environmental load and control of the sulfonation degree.

The sulfonation degree of the surface of the membrane are not particularly limited, and those which optimize properties of the composite membrane after the Layer-by-Layer treatment at the later stage and mechanical strength of the supporting membrane are selected.

Evaluation of the NaCl-rejection rate of the supporting membrane after sulfonation is preferably used to evaluate the sulfonation degree. In the evaluation of the NaCl-rejection rate under conditions of evaluation of 0.5 MPa and a concentration of NaCl of 1500 ppm, the rejection rate is preferably in the range of 5 to 70% and more preferably 10 to 60%.

For the evaluation of the sulfonation degree, measurement of elemental composition by X-ray photoelectron spectroscopy (XPS) may also be preferably used, in which the amount of elemental sulfur derived from a sulfonic acid group on the surface of the supporting membrane is relatively compared. Although the ratio of elemental sulfur by XPS may slightly vary depending on the ratio of the amount of elements derived from the remaining solvent, the ratio of elemental sulfur on one main surface (the main surface on which the separation layer is disposed) of the supporting membrane is preferably 0.2 to 10%, and more preferably 0.5 to 5%. It is preferable that the ratio of elemental sulfur on the other main surface of the supporting membrane be less than 0.5%.

in the case of a flat membrane and a hollow fiber membrane of an outside-in filtration mode, a batch treatment involving immersing a supporting membrane in a bath filled with sulfuric acid or a continuous immersion treatment by transfer between rolls may be preferably used as a method for immersing the supporting membrane in sulfuric acid.

It is preferable to wash with pure water the supporting membrane after treatment with sulfuric acid. It is preferable to extend the time of washing with pure water or carry out a multi-stage washing step so that no sulfur remains. It is also preferable to immerse the membrane in an aqueous solution of an inorganic salt such as sodium sulfate, sodium chloride or potassium chloride after washing as necessary to replace proton as the counter ion in the sulfonic acid group with an inorganic ion in view of improvement in thermal stability of polymer.

In the case of a hollow fiber membrane of an inside-out filtration mode, it is preferable to use a method in which hollow fiber membranes are formed into a module in advance, the potting portions at both ends of a bundle of hollow fiber membranes is cut and opened, and sulfuric acid is injected therein to from the end to sulfonate the inner surface of the hollow fiber membrane.

When immersed in sulfuric acid, the supporting membrane may be either dried or hydrous. It is preferable that when a hydrous membrane is immersed in sulfuric acid, the membrane be once immersed in sulfuric acid having low concentration e.g., 80 to 90% by mass) and then subjected to treatment using sulfuric acid having high concentration (e.g., 90% by mass or more), in view of reduction of heat generation caused by mixing of sulfuric acid and water and change in the concentration of the sulfuric acid bath. When a dried supporting membrane is used, it is preferable to carry out a treatment using sulfuric acid having high concentration (e.g., 90% by mass or more.) directly.

Separation Layer

A separation layer is disposed on one main surface of the supporting membrane. The separation layer includes polyvinyl alcohol having an ionic functional group.

The sulfonated main surface of the supporting membrane (sulfonated PPO) is strongly anionic. This enables a thin separation layer (e.g., 1 nm to 100 nm) to be formed by an LBL method in which polyvinyl alcohol having an ionic functional group is brought into contact therewith.

Polyvinyl Alcohol

Polyvinyl alcohol having an ionic functional group (ionic PVA) is used for forming the separation layer.

The ionic functional group is at least a cationic functional group (cationic group) or an anionic functional group (anionic group). Since the sulfonated surface of the supporting membrane is anionic as described above, PVA having at least a cationic group is used to prepare a separation membrane by an LbL method.

Polyvinyl alcohol having a cationic group (cationic PVA) may be provided by a known polymerization method. A solution polymerization method using methanol is convenient and thus preferably used. A method ma be used which includes copolymerizing vinyl acetate and a cationic group-containing monomer and then saponifying the resultant with alkali to give the intended cationized polyvinyl alcohol, or a method may be used in which part of the hydroxyl groups of polyvinyl alcohol which has been previously saponified is reacted with a cationizing agent having an epoxy group to give a cationized copolymer.

Examples of cationic groups include an amino group, an imino group, an ammonium group, a sulfonium group and a phosphonium group. A quaternary ammonium group is preferred because it is easily available and has excellent durability for free chlorine. Furthermore, it is preferable that the cationic group-containing monomer unit should not include an ester bond, in view of provision of durability to hydrolysis by alkali. Polyvinyl alcohol (copolymer) may include two or more types of cationic group-containing monomers.

The counter ion of the cationic group is not particularly limited, and chloride ions are convenient and preferred.

It is preferable that the cationic PVA copolymer have a weight average molecular weight (Mw) of 10,000 or more and 200,000 or less in a differential molecular weight distribution curve obtained in gel permeation chromatography.

A specific preferred example of the cationic PVA is a polyvinyl alcohol copolymer containing a cyclopolymerization product of diallyl dimethylammonium chloride represented by the following formula (3) because it has excellent resistance to free chlorine and alkali resistance. In the formula (3), m, n and 1 each independently represent a natural number (the same applies to the following formulas (4) to (8)).

[Formula 3]

(3)

Another preferred example of the cationic PVA is a polyvinyl alcohol copolymer containing a polymerization product of 3-(methacrylamido)propyl trimethylammonium chloride represented by the following formula (4) because it has excellent alkali resistance despite its poor resistance to free chlorine due to its amide bond.

[Formula 4]

(4)

Still another preferred example of the cationic PVA is polyvinyl alcohol copolymer prepared by reacting glycidyl trimethylammonium chloride represented by the following formula (5) with part of the hydroxyl groups of polyvinyl alcohol because it has excellent resistance to free chlorine and alkali resistance.

[Formula 5]

(5)

Polyvinyl alcohol having an anionic group (anionic PVA) may also be prepared by a known polymerization method. A solution polymerization method using methanol is convenient and thus preferably used. It is convenient and preferable to use, for example, a method including copolymerizing vinyl acetate and an anionic group-containing monomer and then saponifying the copolymer with alkali to give the intended anionic polyvinyl alcohol (copolymer).

Examples of anionic groups include a sulfonic acid group, a carboxyl group and a phosphorus group. The sulfonic acid group is particularly preferred in view of availability and excellent ion dissociation properties. It is preferable that the anionic group-containing monomer unit should not include an ester bond, in view of provision of durability to hydrolysis by alkali. Polyvinyl alcohol (copolymer) may include two or more types of anionic group-containing monomers.

The counter ion of the anionic group is not particularly limited, and sodium ions and potassium ions are convenient and preferred.

A specific preferred example of the anionic PVA is a polyvinyl alcohol copolymer containing a polymerization product of sodium vinylsulfonate represented by the following formula (6) because it has excellent resistance to free chlorine and alkali resistance.

[Formula 6]

(6)

Another preferred example of the anionic PVA is a polyvinyl alcohol copolymer containing a polymerization product of sodium allylsulfonate represented by the following formula (7) because it has excellent resistance to free chlorine and alkali resistance.

[Formula 7]

(7)

Still another preferred example of the anionic PVA is a polyvinyl alcohol copolymer containing a polymerization product of sodium 2-acrylamide-2-methylpropanesulfonate represented by the following formula (8) because it has excellent alkali resistance despite its poor resistance to free chlorine due to its amide bond.

[Formula 8]

(8)

It is preferable that when the above ionic PVA is a PVA copolymer including a structural unit containing a cationic group, the ratio of introduction of the structural unit containing an ionic functional group (in particular, a cationic group) be 0.3 to 6%. The ratio of introduction of a structural unit containing an ionic functional group, M (%), is represented by the following equation using symbols m, n, l in the above formulas.

$$M = 100 \times m/(m+n+l)$$

The amount of introduction of the ionic functional group can be measured by proton nuclear magnetic resonance ($^1$H-NMR) using, for example, a deuterated solvent.

When the ratio of introduction of a structural unit containing an ionic functional group, M, is less than the above range, the number of ionic bonds between the sulfonated surface of the supported membrane and the polyvinyl alcohol copolymer very small to thereby fail to sufficiently form the adsorption layer, and as a result, desalting properties of the composite membrane finally obtained may not be sufficient. Furthermore, when the ratio of introduction of a structural unit containing an ionic functional group, M, is more than the above range, the charge density in the separation layer is excessively increased to thereby increase the pore size, and as a result desalting properties of the composite membrane finally obtained may not be sufficient.

It is preferable that the above ionic polyvinyl alcohol have a degree of acetylation of less than 20%. In other words, it is preferable that the above ionic polyvinyl alcohol have a degree of saponification of 80% or more and less than 100%. When the degree of acetylation is more than the range, the density of crosslinking caused by aldehyde described later is reduced, and desalting properties of the composite membrane are likely to be reduced, it is preferable that the number of the acetyl groups in the structural unit of vinyl acetate, which is represented by symbol 1 in the above formula, be small, because of its susceptibility to alkaline hydrolysis, The degree of acetylation is preferably less than 5%, and more preferably less than 1%. The degree of acetylation A (%) is represented by the following equation using symbols n, 1 in the above formulas.

$$A=100 \times 1/(n+1)$$

The degree of acetylation (or degree of saponification) can be determined by proton nuclear magnetic resonance ($^1$H-NMR) using, for example, a deuterated solvent.

The molecular weight of ionic polyvinyl alcohol affects the ratio of desalting of the composite membrane. When the polyvinyl alcohol copolymer has a degree of acetylation within the range defined above and a molecular weight within the range of 10,000 or more and 200,000 or less, the composite membrane has preferable properties. though the molecular weight of the polyvinyl alcohol copolymer and properties of the membrane also vary depending on the degree of acetylation. When the molecular weight is less than the range, adsorbing molecules have extremely small coil diameter, and polymer enters the inside of the membrane from the surface of the supporting membrane, so that fine defects are likely to be formed in the separation layer. Furthermore, when the molecular weight is more than the range, adsorbing molecules have extremely large coil diameter, and fine defects are also likely to be formed in the separation layer. The polyvinyl alcohol copolymer has a molecular weight of more preferably 20,000 or more and 180,000 or less.

The weight average molecular weight (molecular weight) of the ionic polyvinyl alcohol is measured by el permeation chromatography (GPC) using hexafluoroisopropanol to which 10 mM sodium trifluoroacetate has been added as a solvent, and is calculated in terms of polmethyl methacrylate as a standard substance.

Adsorption of Separation Layer on Supporting Membrane

The surface of the sulfonated PPO supporting membrane is anionic, and thus when the above polyvinyl alcohol having an ionic functional group (e.g., an aqueous solution thereof) is brought into contact therewith, an adsorption layer may be formed via Coulomb's three using the known Layer-by-Layer (LbL) method.

It is preferable to bring an aqueous solution of a polyvinyl alcohol copolymer having an anionic functional group into contact with the surface of the supporting membrane if desired. By repeating a cycle of bringing such an aqueous solution of a polyvinyl alcohol copolymer having a positive or negative ionic group into contact with the supporting membrane alternately and adsorbing it thereto several times, the amount of adsorption of polymer can be adjusted. It is preferable that at that stage a step of rinsing the surface of the supporting membrane with pure water for about 1 second to 30 minutes be inserted therebetween. The time of bringing the supporting membrane into contact with the respective polymer solutions is preferably 1 minute or more and 6 hours or less, and more preferably 10 minutes or more and 1 hour or less. The temperature of the polymer solution is preferably 5° C. or more and less than 40° C., and more preferably 10° C. or more ad 30° C. or less. A highly integral and defect (e.g., a defect having a size of 1 nm or more and 100 nm or less)-free composite membrane may be gained under these conditions.

Crosslinking of Polyvinyl Alcohol

It is preferable that the polyvinyl alcohol be crosslinked in the separation layer.

By cross-linking hydroxyl groups of PVA with a cross-linking agent such as glutaraldehyde (acetalization), the PVA separation layer is made less hydrophilic and denser. A composite membrane having excellent permeation selectivity and high desalting ratio can be prepared by a cross-linking treatment of the PVA separation layer which has been formed to be extremely thin without defects by a LbL method.

It is preferable to use aldehyde as a cross-linking agent because it is convenient and economical. Examples of aldehydes (aldehyde compounds) include formaldehyde, acetoaldehyde, propionaldehyde, glyoxal, malondialdehyde, succinaldehyde, glutaraldehyde, benzaldehyde, orthophthalaldehyde, isophthalaldehyde, terephthalaldehyde and 1,3,5-benzenetricarboaldehyde. Of them, formaldehyde and glutaraldehyde are preferably used in view of excellent reactivity of the cross-linking agent and excellent resistance to hydrolysis with acid of the cross-linked product. It is particularly preferable to use glutaraldehyde.

It is preferable that the above cross-linking agent in the form of a solution (a crosslinking solution) be brought into contact with the surface of the supporting membrane. The solvent is not particularly limited, and it is preferable to select a solvent which can dissolve 0.1% by mass or more, more preferably 1% by mass or more, of aldehyde. Water, methanol, ethanol, isopropyl alcohol and a mixed solvent thereof, for example, are preferred as the solvent. It is preferable that the solvent contain 50% by mass or more of water as the main component in order to allow adsorption of polymer to proceed effectively by electrostatic force.

Figure 1:
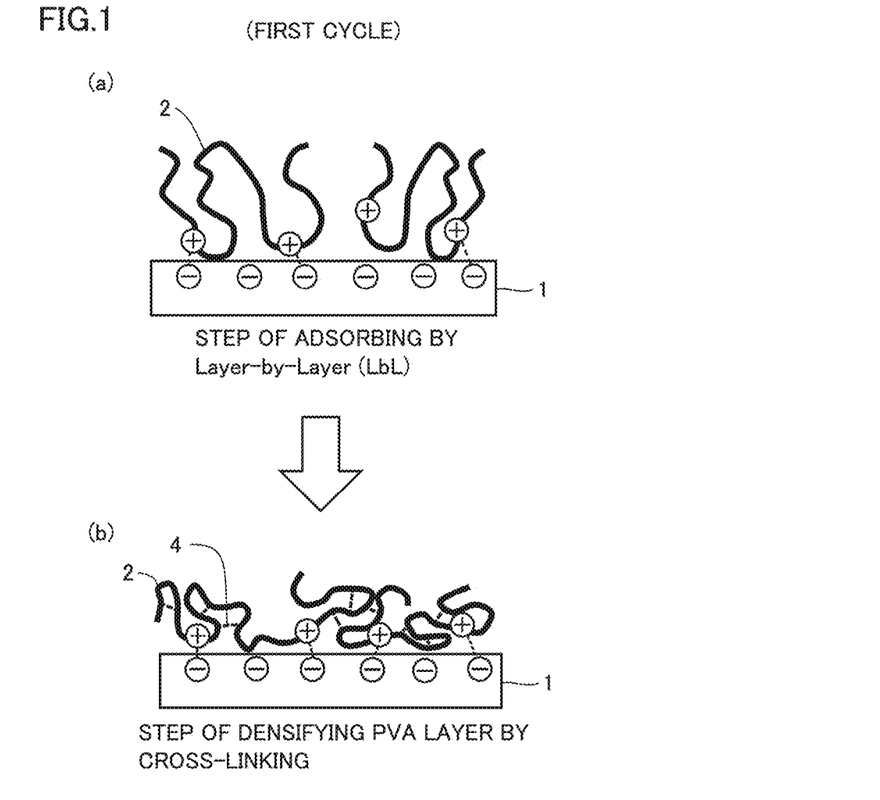
FIG. 1 is a schematic view illustrating the process for forming a separation layer on the main surface of a supporting membrane for the composite membrane of the present invention.
Figure 2:
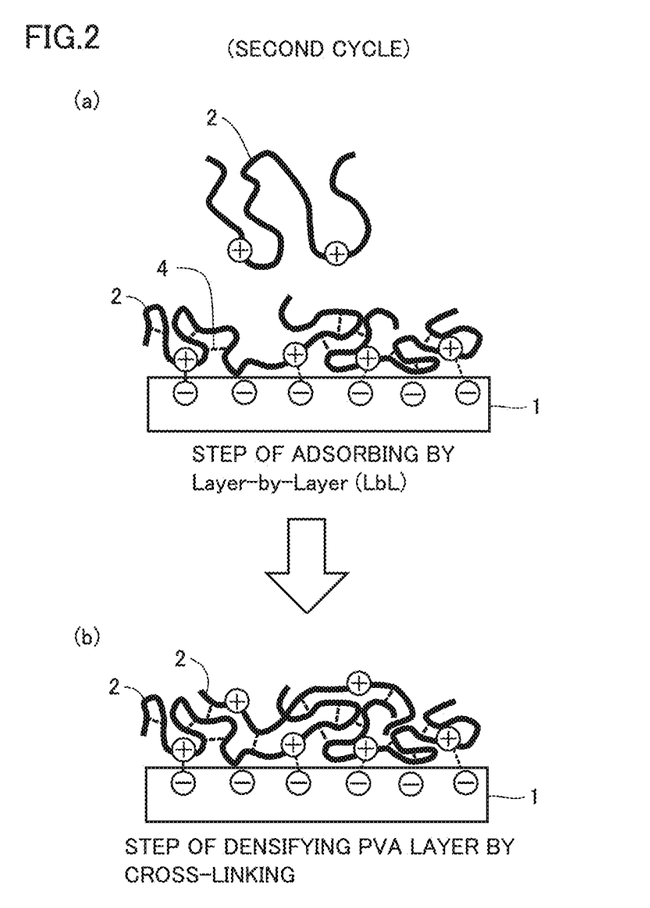
FIG. 2 is a schematic view illustrating the process for forming a separation layer on the main surface of a supporting membrane for the composite membrane of the present invention.
Figure 3:
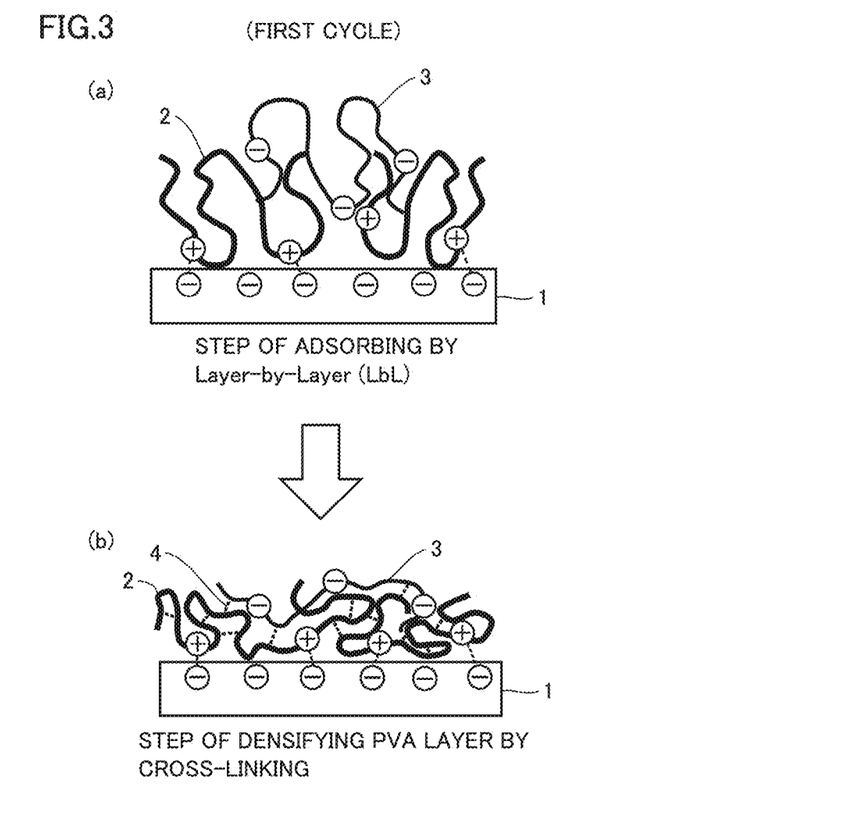
FIG. 3 is a schematic view illustrating the process for forming a separation layer on the main surface of a supporting membrane for the composite membrane of the present invention.
Figure 4:
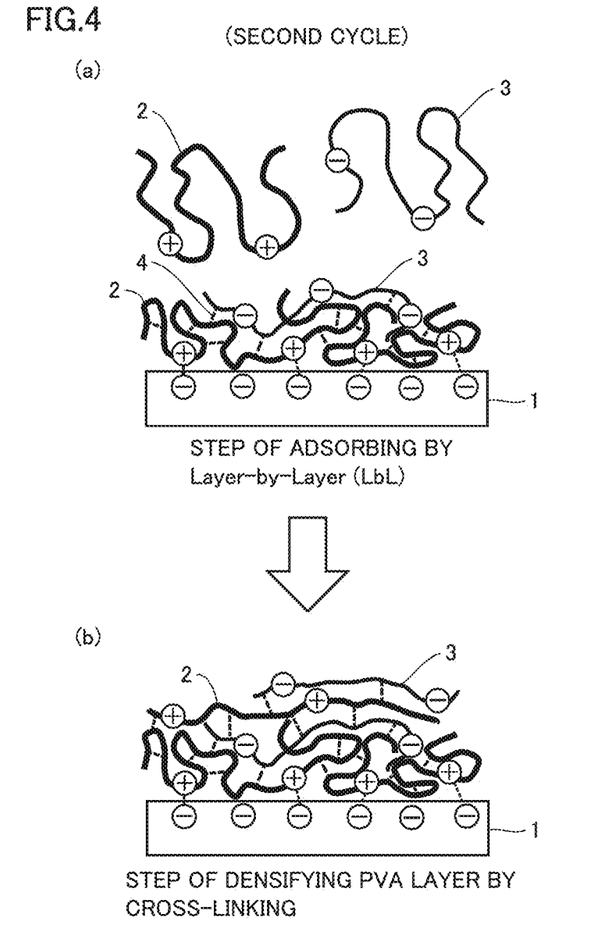
FIG. 4 is a schematic view illustrating the process for forming a separation layer on the main surface of a supporting membrane for the composite membrane of the present invention.

For example, the step of adsorbing the above ionic polyvinyl alcohol (e.g., cationic PVA 2 alone (FIG. 1, FIG. 2) or a combination of cationic PVA 2 and anionic PVA 3 (FIG. 3, FIG. 4) to the surface of the supporting membrane 1 and cross-linking with aldehyde (formation of cross-linked portion 4) is regarded as a cycle (see FIG. 1, FIG. 3), and it is preferable that the cycle be carried out twice or more (see FIG. 2, FIG. 4). Although only one cycle of adsorption and cross-linking may provide desalting properties, it is preferable to perform two or more cycles because a separation membrane having less defects can be prepared. Conditions of the first cross-linking with aldehyde (the type of aldehyde, the concentration of the cross-linking solution, the temperature of cross-linking and the time of cross-linking) may be different from the conditions of the second or later cross-linking with aldehyde, in view of optimization of properties of the membrane.

The time of bringing the supporting membrane into contact with the cross-linking solution is preferably 10 minutes or more and 24 hours or less in view of sufficient reaction to increase the density of cross-linking.

The temperature of cross-linking is preferably 10 to 80° C., and more preferably 20 to 50° C. or less in view of sufficient increase of reactivity.

It is preferable that the cross-linking solution include acid as a catalyst. Sulfuric acid, hydrochloric acid, acetic acid and citric acid may be used as acid and it is preferable to use sulfuric acid because it is convenient and effective for cross-linking reaction.

The above cross-linking caused by acetalization includes formation of an intermolecular cross-linked structure formed by dehydration condensation of two hydroxyl groups of adjacent structural units of vinyl alcohol and an aldehyde group in polyvinyl alcohol (copolymer) and also includes formation of a cross-linked structure in which polymer molecules are connected through a plurality of cyclic acetals with dialdehyde and trialdehyde.

The composite membrane having the above separation layer has high desalting properties of an RO membrane. Furthermore, the firm bonding between the supporting membrane and the separation layer with Coulomb's force prevents reduction of properties caused by peeling of the separation layer and formation of pinholes even in operation such as backwash.

The cross-linked ionic PVA separation layer in the composite membrane has a thickness of preferably 1 to 100 nm, and more preferably 5 nm or more and 50 nm or less.

EXAMPLES

Preparation of Supporting membrane A1 and A2 (PPO Hollow Fiber Membrane)

N-methyl-2-pyrrolidone (hereinafter abbreviated as NMP) was added to polyphenylene oxide PPO 646 (hereinafter PPO) manufactured by SABIC Innovative Plastics to a concentration of 30% by mass for A1 or 35% by mass for A2, and with kneading, PPO was dissolved therein at 130° C. to give a homogeneous stock solution for film formation.

Next, using a double cylindrical nozzle, the stock solution for film formation was discharged as an external solution and an aqueous NMP solution containing 20% by mass of NMP was simultaneously discharged as an internal solution from the hollow part, to thereby form the stock solution into a hollow fiber. The fiber discharged was dried in air gap at room temperature, and then immersed in a coagulation bath filled with pure water at 25° C. The PPO hollow fiber membrane obtained was sufficiently washed to remove impurities such as remaining solvent, and was dried at room temperature. The PPO hollow fiber membrane of the supporting membrane A1 had an outer diameter of 250 μm, a film thickness of 50 μm, and a pure water permeance of 24 LMH/bar. The hollow fiber membrane of the supporting membrane A2 had an outer diameter of 144 μm, a film thickness of 42 μm, and a pure water permeance of 0.5 LMH/bar.

Sulfonation of Supporting Membrane A1 and A2 with Sulfuric Acid 800 pieces of the supporting membranes A1 and A2 (PPO hollow fiber membrane) which were dried were formed into a 1-m long loop. The openings at both ends were sealed and the pieces were bundled. Subsequently, the fiber bundle was immersed in a polytetrafluoroethylene container tilled with sulfuric acid adjusted to a concentration shown in Table 2 (Examples 1 to 5) for the time shown in Table 2 (Examples 1 to 4) to sulfonate the outer surface of the hollow fiber membrane. After treatment with sulfuric acid, the bundle of sulfonated PPO hollow fiber membranes was immersed in a pure water bath at 10° C., and the membrane was thoroughly washed with water until the pH of the washing solution became neutral.

A module for evaluation was prepared using the bundle of hollow fiber membranes obtained and the test for pure water permeance and the test for salt water filtration were performed to measure the pure water permeance and the NaCl-rejection rate. Also, the strength at break of the hollow fiber membrane and the ratio of elemental sulfur (S) on the surface of the membrane were measured. The experimental results shown in Table 2 (Examples 1 to 5) were obtained.

Details of the test for pure water permeance, the test for salt water filtration, the measurement of strength at break, the measurement of the ratio of elemental sulfur (S) on the surface of the membrane and the evaluation of shapes are as described later.

Preparation of Supporting Membrane B (PPO Flat Membrane)

A PPO stock solution for film formation was prepared in the same manner as in preparation of supporting membrane A. A polyester paper (manufactured by Arose Paper Mfg Co., Ltd.) was fixed on a metal substrate placed on a hot plate, and the stock solution kept at 80° C. was applied thereto by a hand coater. The coated membrane on the metal substrate was immersed in a coagulation bath filled with pure water at 25° C. to give a PPO flat membrane. Then the membrane was cleaned to remove impurities such as remaining solvent. The PPO flat membrane excluding the polyester paper had a thickness of 40 μm. The test for pure water permeance was performed and as a result the pure water permeance was 32 LMH/bar.

Sulfonation of Supporting Membrane B with Sulfuric Acid

Supporting membrane B (PPO flat membrane) which had been dried was held in a polytetrafluoroethylene frame, and sulfuric acid having a concentration shown in Table 2 (Example 6) was poured onto the outer surface of the supporting membrane to sulfonate the outer surface of the membrane. After the treatment with sulfonic acid, the sulfonated PPO flat membrane was thoroughly washed with pure water at 10° C. until the pH of the washing solution became neutral.

The pure water permeance and the NaCl-rejection rate of the flat membrane obtained were measured and the ratio of elemental sulfur (S) was measured in the same manner as described above. The experimental results shown in Table 2 (Example 6) were obtained.

Preparation of Supporting Membrane C (PPO Hollow Fiber Membrane)

A hollow fiber membrane was prepared in the same manner as preparing supporting membrane A except for changing the temperature of the aqueous NMP solution in the coagulation bath to 40° C. The PPO hollow fiber membrane had an outer diameter of 250 µm, a film thickness of 50 µm, and a pure water permeance of 90 LMH/bar.

Synthesis of Sulfonated PPO (SPPO) Polymer

In a 5-L, flask, 100 g of PPO was dissolved in 3,200 g of chloroform and a chloroform solution containing 80 g of chlorosulfuric acid was added drop wise thereto at room temperature to allow a sulfonation reaction to proceed for 2 hours to give a reaction product. Subsequently, the reaction product was re-precipitated in hexane and filtrated. A cake-like product obtained by filtration was crashed and immersed in an aqueous 1 M sodium carbonate solution to neutralize the sulfonic acid group in the reaction product with sodium ions. Then, the polymer was formed into flakes and the flakes were thoroughly washed with ion exchange water to remove sodium carbonate salt completely. Thereafter the polymer was dried to give the intended sulfonated PPO (SPPO) polymer. The sulfonation degree measured by $^1$H-NMR was 20% by mole.

Coating of Supporting Membrane C with SPPO

A composite membrane was prepared by coating supporting membrane C with the SPPO polymer synthesized as described above by the following procedure. The hydrous supporting membrane C in the form of hollow fiber wound on a bobbin was unwound, transferred on a roller and immersed in a bath at 40° C. filled with an aqueous glycerol solution having a concentration of 80% by mass to carry out a clogging treatment. Subsequently, the hollow fiber membrane clogged with glycerol was.

dipped in a bath filled with a 1 mass % SPPO solution in dimethyl sulfoxide, and the membrane was pulled up vertically and introduced into a convection dryer to be dried at 160° C. for 1 minute.

800 hollow fiber membranes which had been dried was formed into a 1-m long loop to prepare a module for evaluation. The module for evaluation was immersed in ethanol for 30 minutes and then ethanol was completely replaced with pure water. Thereafter the pure water permeance and NaCl-rejection rate were measured in the same manner as described above. Furthermore, the strength at break of the hollow fiber membrane and the ratio of elemental sulfur (S) on the surface of the membrane were measured in the same manner as described above. The experimental results shown in Table 2 (Comparative Example 1) were obtained.

Preparation of Supporting Membrane D (Hollow Fiber Membrane Prepared by Forming SPPO Polymer into Film Film Forming of SPPO NMP was added to the SPPO polymer synthesized as described above to a concentration of 30% by mass and the mixture was kneaded to give a homogeneous stock solution for film formation. The stock solution was discharged from a double cylindrical nozzle and formed into hollow fiber using a 5% by mass aqueous ammonium nitrate solution as an internal solution. The fiber was dried in air gap and then coagulated in a coagulation bath filled with pure water to give a SPPO hollow fiber membrane. The SPPO hollow fiber membrane has an outer diameter of 250 µm. and a film thickness of 50 µm.

The 800 hollow fiber membranes which had been dried was formed into a 1-m long loop to prepare a module for evaluation. The pure water permeance and the NaCl-rejection rate were measured in the same manner as described above. Furthermore, the strength at break of the hollow fiber membrane and the ratio of elemental sulfur (S) on the surface of the membrane were measured in the same manner as described above. The experimental results shown in Table 2 (Comparative Example 2) were obtained.

Examples 1 to 6, Comparative Examples 1, 2

A separation layer made of an ionic PVA was formed by an LK method on the outer surface of hollow supporting membranes A1 and A2 prepared as described above (see Table 2 for supporting membrane A1 prepared under different conditions of sulfonation and supporting membrane A2 prepared under different conditions for forming a film as the supporting membrane), on the outer surface of supporting membranes B, D and on the surface of flat supporting membrane C. Details of the ionic PVA (copolymers) used are described below.

Synthesis of Cationic Polyvinyl Alcohol (Formula 3)

A reflux condenser, a stirrer, an inlet for introducing nitrogen, a thermometer and an inlet for introducing catalyst and monomer were attached to a 2-L round flask. In the flask, 440 g of methanol, 500 g of vinyl acetate (VAC) and 4.8 g of a 60%. aqueous solution of diallyldimethylammonium chloride (DADMAC) as a cationic monomer were placed, and while introducing nitrogen, the temperature was increased to 60° C. 2,2'-Azobis(2,4-dimethyivaleronitrile) (V-65) was used as a reaction initiator. For highly reactive DADMAC, part thereof was previously placed in the reactor and the rest was fed thereto during reaction so that the distribution of the composition of the copolymer was homogeneous. 11.0 g of a 60% aqueous solution of diallyldimethylammonium chloride and V-65 were dissolved in 30 g of methanol to prepare solutions, respectively, and the solutions were added dropwise to the solution in the flask which was being vigorously stirred, using two metering pump over 4 hours. The NV ratio (ratio of non-volatile components) after completion of the reaction is 40% by mass. The reaction was stopped by reducing the temperature to room temperature and blowing oxygen into the flask.

Next, while keeping the temperature of the polymerization solution at 40° C., a 10 mass % sodium hydroxide solution. in methanol was added thereto in an amount of 50 millimole based on the amount of the vinyl acetate unit in the copolymer to perform saponification for 1 hour. The resulting solid product was crushed in a mixer and thoroughly washed with methanol, and impurities such as remaining alkali and monomer were removed. Then the powdery polymer was naturally dried and then dried in vacuum at 50° C. for 24 hours to give the intended cationized polyvinyl alcohol copolymer.

The resulting cationic PVA had a degree of saponification of 99.7%, The PVA had a weight average molecular weight measured by GPC of 70,200. The amount of cationic monomers introduced measured by $^1$H-NMR. was 1.1% by mole.

Synthesis of Anionic Polyvinyl Alcohol (Formula (7)

An anionic group-containing polyvinyl alcohol copolymer was prepared in the same manner as in the synthesis of the compound represented by the formula (3) except for using sodium allylsulfonate as the anionic monomer. NV at the time of completion of the reaction was 32%.

The resulting APVA had a degree of saponification of 99.6%. The APVA had a weight average molecular weight measured by GPC of 36,000. The amount of cationic monomers introduced measured by $^1$H-NMR was 1.4% by mole.

A polyvinyl alcohol separation layer was formed by an LbL method as schematically described in FIG. 1. When the above cationic polyvinyl alcohol (CPVA) 2 was used alone, a 0.1% CPVA aqueous solution was brought into contact with surface 1 of the sulfonated PPO (SPPO) supporting membrane, and then 1.0% by mass of glutaraldehyde (GA) was brought into contact therewith as a cross-linking agent at 40° C. for 2 hours. Subsequently the membrane was thoroughly washed with water. These processes were defined as the first cycle (see FIG. 1), and the processes under the same conditions were carried out again as the second cycle (see FIG. 2). The cross-linking time with GA in the second cycle was 1.5 hours at 40° C. This 1. provided a separation membrane whose number of PVA laminations was two.

Meanwhile, in the film forming method combining CPVA and anionic PVA (APVA), an aqueous 0.1% CPVA solution was brought into contact with surface 1 of the SPPO supporting membrane, an aqueous 0.1% APVA3 solution was brought into contact therewith, and then 1.0% by mass of glutaraldehyde (GA) was brought into contact therewith as a cross-linking agent at 40° C. for 2 hours. Subsequently the membrane was thoroughly washed with water. These processes were defined as the first cycle (see FIG. 3), and the processes under the same conditions were carried out again as the second cycle (see FIG. 4). The cross-linking time with GA in the second cycle was 15 hours at 40° C. This provided a separation membrane whose number of PVA laminations was four.

An overview including conditions for forming the PVA separation layer is shown in Table 1.

TABLE 1

CONDITIONS OF PREPARING PVA SEPARATION LAYER

| | Conditions of experiment | | | | | | | |
|---|---|---|---|---|---|---|---|---|
| | Conditions of LbL treatment | | Cationic PVA | | | Anionic PVA | | |
| | NUMBER OF PVA LAMINATIONS | Cross-linking agent | Degree of cationization (%) | Degree of saponification (%) | Mw (Da) | Degree of anionization (%) | Degree of saponification (%) | Mw (Da) |
| Examples 1, 2 | 2 | 1% Glutaraldehyde aqueous solution | 1.1 | 99.7 | 70,200 | — | — | — |
| Examples 3-6 | 4 | | | | | 1.4 | 99.6 | 36,000 |
| Comparative Examples 1, 2 | | | | | | | | |

The composite membranes of Examples 1 to 6 and Comparative Examples 1,2 were produced as described above.

Evaluation

Pure Water Permeance and Ion-Rejection Rate of Supporting Membrane and Composite Membrane The appropriate number of fiber bundles of the hollow fiber supporting membranes (supporting membranes A1, A2, C and D) and the hollow fiber composite membranes (Examples 1 to 5 and Comparative Examples 1,2) were formed into a loop and this was inserted into a polycarbonate sleeve having an inner diameter of 13 mm and a length of 5 cm. Then two-pack epoxy resin was injected into the sleeve and cured to encapsulate the membranes. The end of the hollow fiber membrane after curing was cut to form an opening face of the hollow fiber membrane to prepare a module for evaluation. The module for evaluation was connected to a tester for properties of hollow fiber membrane equipped with a feed water tank and a pump to evaluate properties.

Properties of the flat supporting membrane (supporting membrane B) and the flat composite membrane (Example 6) were evaluated by using; an apparatus for evaluation, which was SEPA-CFII Cross Flow Tester manufactured by SUEZ to which a feed water tank and a pump were connected.

As for conditions of evaluation for Examples 1, 3 to 6 and Comparative Examples 1, 2, operation was carried out using an aqueous feed solution in which the concentration of sodium chloride or magnesium sulfate was adjusted to 1,500 ml, at 25° C. and a pressure of 5 bar (0.5 MPa) for 1 hour. Water which passed through the membrane was collected and the weight of the water which passed was measured with an electronic balance. The weight of water which passed was converted to the amount of water which might pass at 25° C. by the following equation. For Example 2, evaluation was performed in the same manner except for a concentration of sodium chloride of 32,000 mg/L, 25° C. and a pressure of 55 bar (5.5 MPa).

Amount of water which might pass (L)=Weight of Water which passed (kg)/ 0.99704 (kg/L)

Water permeation (FR) was calculated by the following equation.

FR [L/m$^2$/day]=Amount of water which might pass [L]/area of membrane [m$^2$]/collecting time [minutes]×(60 [minutes]×24 [hours])

The pure water permeance (A value) was determined by the following equation after carrying out a permeation test with pure water to measure water permeation (FR).

A value [LMH/bar]=FR [L/m$^2$/day]/24 [hours]/testing pressure [bar] wherein LMH means L/m$^2$ /h.

The ion-rejection rate (NaCl and MgSO4) was evaluated as follows. The conductivity of water which passed though the membrane and collected in the above measurement of water permeation and the conductivity of the aqueous solution fed were measured using an electric conductivity meter (DKK-TOA Corporation, CM-25R). The ion-rejection rate was calculated by the following equation.

Ion-rejection rate [%]=(1—conductivity of water which passed though membrane [μS/cm] conductivity of aqueous solution fed [μS/cm]×100

Resistance to Backwash and Retention of NaCl-Rejection Rate of Composite Membrane For the hollow fiber composite membranes (Example to 5 and Comparative Examples 1,2), pure water was supplied from the permeation side at the opening end of the bundle of hollow fiber membranes at a pressure of 10 bar (1.0 MPa) with the feed side of the module for evaluation being open to atmospheric pressure to perform operation of backwash for 30 minutes. Subsequently, the NaCl-rejection rate of the module for evaluation was assessed to evaluate retention of the rejection rate before and after the operation of backwash. The retention was calculated by the following equation.

Retention of NaCl-rejection rate [%]=100×NaCl-rejection rate [%] after backwash/NaCl-rejection rate [%] before backwash For the flat composite membrane (Example 6), the membrane was arranged upside down in SEPA-CFII Cross Flow Tester, and operation of backwash was performed so that pressure was applied to the separation layer from the supporting membrane. Pure water was fed at a pressure of 10 bar (1.0 MN) to perform the operation of backwash for 30 minutes. Subsequently, the NaCl-rejection rate was evaluated in the same manner as for the hollow fiber membranes to evaluate retention of the rejection rate before and after the operation of backwash.

Collapse Pressure of Hollow Fiber Composite Membrane

For the composite membranes including the hollow fiber supporting membrane (Examples 1 to 5 and Comparative Examples 1, 2), the pressure for evaluation was increased by 0.5 bar at intervals of 20 minutes, and the collapse pressure at which the hollow fiber membrane was compressed and deformed irreversibly to significantly reduce water permeance was measured to evaluate the difference in pressure resistance of the membranes. Since pressure resistance is affected by the ratio of the outer diameter to the inner diameter of the hollow fiber membrane and the density of polymer in the membrane, the membranes was made such that the cross-sectional shapes thereof were the same in Examples 1, 3.4 and Comparative Examples 1, 2, except for Example 2, in which pressure resistance was evaluated at 55 bar (5.5 MPa).

In the composite membrane prepared by using a flat supporting membrane (Example 6), no collapse due to compression as found in the hollow fiber membrane was observed and significant irreversible reduction of water permeance was not found until 50 bar.

Strength at Break of Hollow Fiber Supporting Membrane

A tensile test was performed for the hollow fiber supporting membranes (supporting membranes A1, A2, C, D) and the mechanical strength of the hollow fiber membranes was compared. Compact Table-Top Universal Tensile Tester, EZ Test EZ-SX50N manufactured by Shimadzu. Corporation was used as a tensile tester and evaluation was carried out with a sample length of 50 min at a tensile rate of 10 mm/minutes. The strength at break (MPa) was calculated by the following equation.

(Strength at break)=(Strength at break of hollow fiber membrane)/(Cross-sectional area of hollow fiber membrane)

Evaluation of Shape of Supporting Membrane

The shape of the supporting membranes was evaluated and the cross-sectional area of the supporting membranes was calculated by the following method. A suitable number of bundles of hollow fiber membrane was packed in pores of a 2-mm thick SUS plate in which pores having a diameter of 3 mm were opened, and the bundle was cut with a razor blade to expose a cross-section. Then a microscope (ECLIPSE LV100) manufactured by Nikon Corporation, an image processing apparatus (DIGITAL SIGHT DS-U2) and a CCD camera (DS-Ri1) manufactured by Nikon Corporation were used to take a photograph of the cross-sectional shape. The outer diameter and the inner diameter of the cross-section of the hollow fiber membrane were measured using the measurement function of an image analyzing software (NIS Element D3.00 SP6) to calculate the outer diameter, the inner diameter and the thickness of the hollow fiber membrane.

For the evaluation of the shape of the flat membrane, a hydrous sample was frozen with liquid nitrogen, cut and air-dried, and Pt was sputtered on the cut surface The shape was observed using scanning electron microscope S-4800 manufactured by Hitachi, Ltd. at an accelerated voltage of 5 kV to measure the thickness of the membrane.

Ratio of Sulfur on the Surface of Supporting Membrane: S Ratio on the Surface

The ratio of elemental sulfur was determined by analyzing the amount of elemental sulfur on the surface of the sulfonated membrane by X-ray photoelectron spectroscopy. The amount of elemental sulfur on the outer surface of the hollow fiber supporting membrane and the flat supporting membrane was directly measured, while the amount on the inner surface of the hollow fiber supporting membrane was measured after opening the membrane with a knife. The apparatus used and conditions of measurement are as described below.
[Apparatus] K-Alpha+ (manufactured by Thermo Fisher Scientific)
[Conditions of measurement]
(Excited X-ray) monochromated Al Kα ray
(X-ray output) 1.2 kV, 2.5 mA
(Angle of emission of photoelectron) 90°
(Spot size) about 200 μmφ
(Path energy) 50 eV
(Step) 0.1 e V Evaluation of Presence of Defects Such as Peeling on the Surface of Composite Membrane Peeling of the separation layer of the composite membrane and the presence of defects such as pinholes were evaluated using a scanning electron microscope (SEM) and transmission electron microscope (TEM).

For the evaluation using SEM, a sample al the hollow fiber composite membrane or the flat composite membrane, which was completely hydrated, was frozen with liquid nitrogen, cut and air-dried, and Pt was sputtered on the cut surface. The surface was Observed using scanning electron microscope S-4800 manufactured by Hitachi, Ltd. at an accelerated voltage of 5 kV.

For the evaluation using TEM, the hollow fiber composite membrane and the flat composite membrane were electronically stained and then embedded in epoxy resin. The sample embedded was cut into an ultrathin piece using a ultramicrotome, carbon was deposited thereon and the sample was observed by the TEM. A transmission electron microscope, JEM-2100 manufactured by JEOL Ltd. was used. As for the condition of observation, the sample was observed at an accelerated voltage of 200 kV.

For each of SEM and TEM, the samples of the cross-section of the membranes were observed (n=3) to examine whether peeling of the separation layer or pinholes were present.

Figure 5:
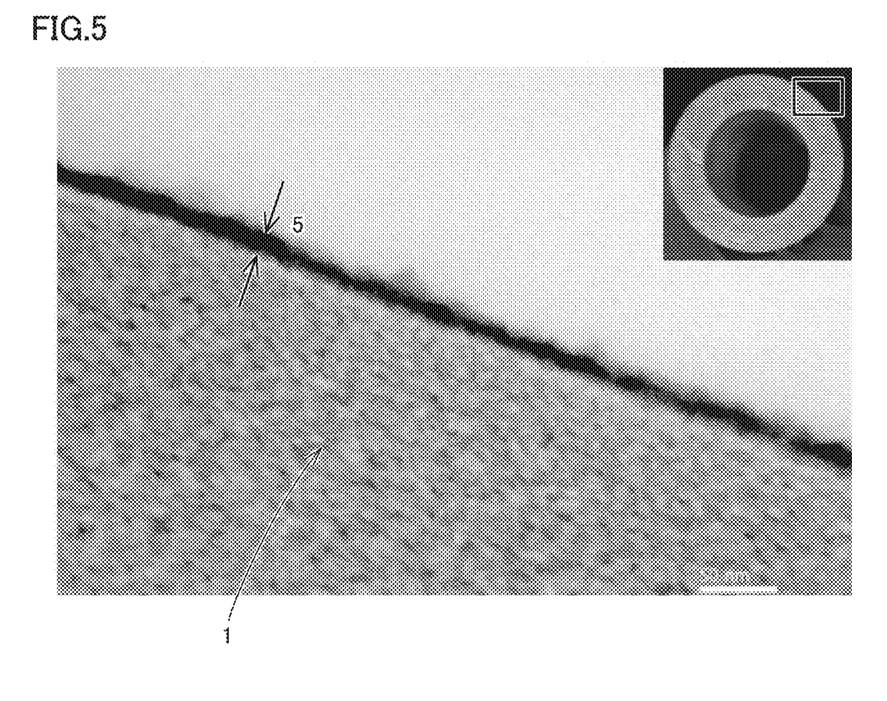
FIG. 5 is a photograph showing a cross-sectional view of the composite membrane of the present invention.

For observation of cross-linked PVA separation layer 5 with TEM, a membrane sample was immersed in a 10-fold dilution of titanium lactate cross-linking agent (TC310) manufactured by Matsumoto Fine Chemical Co., Ltd. under conditions of 24 hours and 40° C. with reference to WO 2017/064936. Thus, part of the hydroxyl groups in PVA separation layer 5 was cross-linked to introduce elemental titanium into PVA separation layer 5 to thereby give contrast of electron density. Subsequently, the sample was thoroughly washed with water, electronically stained, and observed by TEM in the same manner as above (FIG. 5).

TABLE 2

| | | | Conditions of sulfonation | | Properties of sulfonated supporting membrane | | | | |
|---|---|---|---|---|---|---|---|---|---|
| | | | Concentration | Time of immersion | Pure water | | | S Ratio on surface | |
| | Shape of membrane | Supporting membrane | of sulfuric acid wt % | in sulfuric acid min | permeance (A value) LMH/bar | NaCl— rejection % | Strength at break MPa | Outer surface % | Inner surface % |
| Example 1 | Hollow fiber membrane | A1 | 94.5 | 30 | 4.2 | 43 | 18.0 | 1.7 | 0.2 |
| Example 2 | Hollow fiber membrane | A2 | 94.5 | 30 | 0.6 | 62 | 62.0 | 1.8 | <0.1 |
| Example 3 | Hollow fiber membrane | A1 | 94.5 | 30 | 3.2 | 48 | 17.8 | 0.9 | 0.2 |
| Example 4 | Hollow fiber membrane | A1 | 92.0 | 60 | 1.6 | 54 | 18.2 | 0.5 | <0.1 |
| Example 5 | Hollow fiber membrane | A1 | 95.5 | 10 | 5.3 | 37 | 18.2 | 2.2 | 0.4 |
| Example 6 | Flat-sheet membrane | B | 94.5 | 30 | 15 | 42 | — | 1.6 | 0.2 |

TABLE 2-continued

| | | | | | | | | |
|---|---|---|---|---|---|---|---|---|
| Comparative Example 1 | Hollow fiber membrane | C | Coated with SPPO | 5.1 | 45 | 17.6 | 1.8 | <0.1 |
| Comparative Example 2 | Hollow fiber membrane | D | SPPO asymmetric membrane | 2.8 | 38 | 4.8 | 2.0 | 1.6 |

| | Properties of composite membrane | | | | |
|---|---|---|---|---|---|
| | Test conditions(Examples 1, 3 to 5, Comparative Examples 1, 2) 5 bar, 1,500 mg/L *(Example 2) 55 bar 32,000 mg/l | | | Resistance to backwash | Defect in |
| | Pure water permeance (A value) LMH/bar | NaCl— rejection % | $MgSO_4$— rejection % | Retention of NaCl— rejection % | Collapse pressure MPa | separation layer Presence/ No |
| Example 1 | 0.30 | 99.3 | 99.8 | 100 | 4.0 | No |
| Example 2 | 0.10* | 99.75* | — | 100 | >7.0 | No |
| Example 3 | 0.50 | 98.5 | 99.7 | 100 | 4.0 | No |
| Example 4 | 0.15 | 97.5 | 99.3 | 99 | 4.0 | No |
| Example 5 | 0.80 | 95.6 | 99.3 | 100 | 4.0 | No |
| Example 6 | 1.1 | 98.2 | 99.2 | 100 | — | No |
| Comparative Example 1 | 1.2 | 93.0 | 97.0 | 75 | 3.5 | Yes |
| Comparative Example 2 | 0.2 | 96.2 | 99.1 | 99 | 1.5 | No |

The results in Table 2 show the following; in the composite membranes of Examples 1 to 6, which are included in the present invention, the sulfonated supporting membrane has an asymmetric structure, bonding properties of the supporting membrane and the separation layer are excellent, and thus detects such as separation between the surface of the sulfonated PPO membrane and the PPO supporting membrane are not caused. As a result, the retention of the NaCt-rejection rate is excellent.

By contrast, in the composite membrane of Comparative Example 1 prepared by an treatment of a membrane having a two-layer structure prepared by coating the surface of a PPO supporting membrane with SPPO, peeling was observed on the interface between the PPO membrane and the SPPO layer in backwash. It is considered that for this reason the retention of the NaCl-rejection rate was reduced.

The composite membrane of Comparative Example 2, which was composed of a supporting membrane made of SPPO and a PVA separation layer, has excellent bonding properties between the supporting membrane and the separation layer, but the strength at break was clearly reduced because the whole supporting membrane was made of SPPO.

The cross-sectional image (TEM image) of the composite membrane shown in FIG. 5 provides an example of the surface of the sulfonated PPO supporting membrane 1. The image also provides an example of a PVA cross-linked layer (PVA separation layer 5) formed on the surface of the sulfonated PPO supporting membrane.

The embodiments and examples disclosed herein are illustrative in all respects and should not be construed as limiting. The scope of the present invention is indicated by the claims, not by the above description. The present invention includes equivalents of the claims and all modifications within the scope of the present invention.

REFERENCE SIGNS LIST

1 Supporting membrane
2 Cationic PVA
3 Anionic PVA.
4 Cross-linked portion
5 PVA Separation layer

The invention claimed is:

1. A composite membrane comprising:
   a supporting membrane that includes polyphenylene oxide; and
   a separation layer that is disposed on one main surface of the supporting membrane,
   wherein the polyphenylene oxide is sulfonated on the one main surface of the supporting membrane,
   the supporting membrane has an asymmetric membrane structure in which a polyphenylene oxide phase is gradually replaced by a sulfonated polyphenylene oxide phase, and
   the separation layer includes polyvinyl alcohol having an ionic functional group.

2. The composite membrane according to claim 1, wherein the one main surface of the supporting membrane has a ratio of elemental sulfur of 0.2 to 10%.

3. The composite membrane according to claim 1, wherein the ionic functional group is a cationic functional group including a quaternary ammonium group.

4. The composite membrane according to claim 1, wherein the ionic functional group is an anionic functional group including a sulfonic acid group.

5. The composite membrane according to claim 1, wherein the polyvinyl alcohol is crosslinked in the separation layer.

6. A method for producing the composite membrane according to claim 1, comprising:
   bringing sulfuric acid into contact with a surface of the supporting membrane, thereby sulfonating at least part of the surface; and
   adsorbing the separation layer to the sulfonated surface of the supporting membrane.

7. The method according to claim 6, wherein sulfuric acid having a concentration of 90 to 98% by mass is brought into contact with the surface of the supporting membrane in the sulfonating.

* * * * *